(12) United States Patent
Krenz et al.

(10) Patent No.: US 8,820,815 B2
(45) Date of Patent: Sep. 2, 2014

(54) DUCTED SEAT FOR A VEHICLE

(71) Applicant: GM Global Technology Operations LLC, Detroit, MI (US)

(72) Inventors: Andrew R. Krenz, Northville, MI (US); Damond N. Hinatsu, Romeo, MI (US); Nicole Leslie Nicholas, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/736,181

(22) Filed: Jan. 8, 2013

(65) Prior Publication Data
US 2014/0191556 A1 Jul. 10, 2014

(51) Int. Cl.
*B60N 2/58* (2006.01)

(52) U.S. Cl.
USPC ........................................ 296/65.01; 296/209

(58) Field of Classification Search
CPC ................................ B60N 2/5883; B60N 2/58
USPC .............................................. 296/65.01, 209
See application file for complete search history.

(56) References Cited

U.S. PATENT DOCUMENTS

| | | | | |
|---|---|---|---|---|
| 6,644,070 | B2* | 11/2003 | Ikenaga et al. | 66/196 |
| 8,286,451 | B2* | 10/2012 | Mueller et al. | 66/195 |
| 2008/0196957 | A1* | 8/2008 | Koike et al. | 180/68.5 |
| 2012/0299358 | A1* | 11/2012 | Herbst | 297/452.46 |

* cited by examiner

*Primary Examiner* — Glenn Dayoan
*Assistant Examiner* — Beverly Becker
(74) *Attorney, Agent, or Firm* — Quinn Law Group, PLLC

(57) ABSTRACT

A vehicle includes a passenger compartment, a cargo compartment, a battery, and a ducted seat. The battery is disposed in the cargo compartment and dissipates heat when energized such that air in the vehicle becomes heated air. The ducted seat is operatively disposed in the passenger compartment. The ducted seat includes a base layer, a ducting layer, and a cover layer. The ducting layer covers the base layer. The cover layer covers the ducting layer. The ducting layer presents a leading opening and trailing opening in fluid communication with one another such that the ducting layer is configured to receive air therein through the leading opening and exhaust air through the trailing opening. The trailing opening is disposed in fluid communication with the cargo compartment such that the exhausted air flows from the trailing opening into the cargo compartment.

16 Claims, 2 Drawing Sheets

US 8,820,815 B2

DUCTED SEAT FOR A VEHICLE

TECHNICAL FIELD

The disclosure relates to a ducted seat for a vehicle.

BACKGROUND

Ambient or conditioned air may be channeled from one area of a vehicle to another via a return air duct. For example, the return air duct may direct heated, cooled, and/or humidified air from one portion of the vehicle, such as an instrument panel, to another portion of the vehicle, such as a rear passenger footwell. Often, a path or routing for the return air duct through the vehicle is circuitous, because of obstacles such as seating hardware, electronics, structural components, and the like.

SUMMARY

A ducted seat is configured for attachment to a vehicle. The ducted seat includes a base layer, a ducting layer, and a cover layer. The ducting layer operatively covers the base layer. The cover layer operatively covers the ducting layer such that the ducting layer is sandwiched between the base layer and the cover layer. The ducting layer presents a leading opening and trailing opening in fluid communication with one another such that the ducting layer is configured to receive air therein through the leading opening and exhaust air through the trailing opening.

In another aspect of the disclosure, a vehicle includes a passenger compartment, a cargo compartment, a battery, and a ducted seat. The cargo compartment is disposed proximate the passenger compartment. The battery dissipates heat when energized such that air in the vehicle becomes heated air. The battery is operatively disposed in the cargo compartment. The ducted seat is operatively disposed in the passenger compartment. The ducted seat includes a base layer, a ducting layer, and a cover layer. The ducting layer operatively covers the base layer. The cover layer operatively covers the ducting layer such that the ducting layer is sandwiched between the base layer and the cover layer. The ducting layer presents a leading opening and trailing opening in fluid communication with one another such that the ducting layer is configured to receive air therein through the leading opening and exhaust air through the trailing opening. The trailing opening is disposed in fluid communication with the cargo compartment such that the exhausted air flows from the trailing opening into the cargo compartment.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
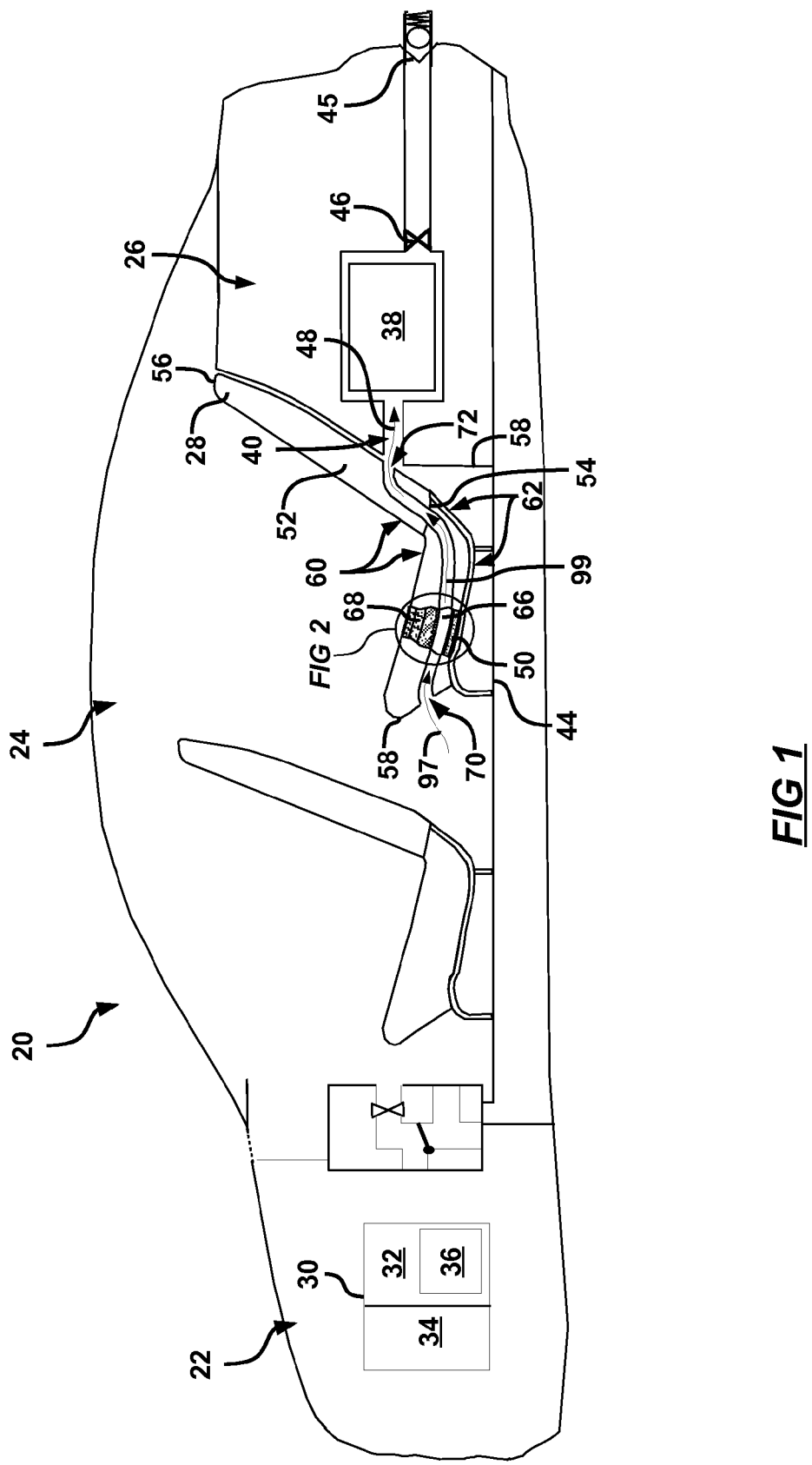
FIG. 1 is a schematic side view of a vehicle having a rear ducted seat.

Referring to the Figures, wherein like reference numerals refer to like elements, a vehicle 20 is shown in FIG. 1. The vehicle 20 includes an engine compartment 22, a passenger compartment 24, and a cargo compartment 26. The passenger compartment 24 is disposed between the engine compartment 22 and the cargo compartment 26. At least one ducted seat 28 is operatively disposed within the passenger compartment 24 of the vehicle 20.

The vehicle 20 may be a hybrid electric vehicle 20 (HEV) that includes a powertrain 30 having an internal combustion engine 32 and a transmission 34 which are configured to cooperatively propel the vehicle 20. In addition to the engine and the transmission 34, the vehicle 20 may be configured to be propelled by a motor/generator 36, alone or in combination with the engine. As shown, the motor/generator 36 is positioned within the transmission 34, but may also be positioned anywhere in the vehicle 20, depending on the vehicle 20 architecture and control of the power flow, as known by those skilled in the art. Although a single motor/generator 36 is shown, depending on the actual configuration of the vehicle 20, there may be multiple motor/generators 36 within the driveline of a subject vehicle 20.

A battery 38 is operably disposed inside of the vehicle 20. As shown in FIG. 1, the battery 38 is operably disposed in the cargo compartment 26. The cargo compartment 26 is the location within the vehicle 20 that is generally disposed behind the ducted seat 28 within the passenger compartment 24, e.g., a trunk compartment. However, it should be appreciated that the battery 38 may be disposed anywhere inside of the vehicle 20, such as the passenger compartment 24, the engine compartment 22, and the like. By way of a non-limiting example, the battery 38 may be disposed beneath one or more seats of the vehicle 20. The battery 38 may be a high voltage (HV) battery 38 in the HEV application of the vehicle 20. The battery 38 is configured to be energized to provide power to the powertrain 30 to operate, or otherwise propel, the vehicle 20. When the battery 38 is energizing the motor/generator 36, the battery 38 dissipates heat. As a result of the heat dissipated by energizing the battery 38, air inside of the cargo compartment 26 becomes heated air. When the battery 38 is above ambient temperature, the battery 38 will lose heat through conduction, convection, and radiation. If the ambient temperature becomes greater than the temperature of the battery 38, the battery 38 will absorb heat from the surroundings. Keeping the temperature of the battery 38 low will promote an increased life of the battery 38, which could improve a manufacturing warranty and resale value of the vehicle 20. Therefore, the battery 38 is configured to be air cooled.

A cargo passage 40 is defined between the passenger compartment 24 and the cargo compartment 26. The cargo passage 40 may be defined in a panel 42, extending from a floor 44 of a vehicle 20, between the passenger compartment 24 and the cargo compartment 26. It should be appreciated that other locations disposed between the passenger compartment 24 and the cargo compartment 26 may also be used. A fan 46 may be operably disposed in the cargo passage 40, between the battery 38 and an outlet 45 of the cargo compartment 26, to draw air into the cargo compartment 26, from the passenger compartment 24, to cool the battery 38. Operation of the fan 46 provides a negative pressure differential between the passenger compartment 24 and the cargo compartment 26 such that the fan 46 draws air from the passenger compartment 24 into the cargo compartment 26. Therefore, the battery 38 may be air cooled by directing cooler air from the passenger compartment 24 into the cargo compartment 26, as indicated by the arrow 48. More specifically, cooler air is air that is at a temperature which is less than a temperature of the heated air that is inside of the cargo compartment 26.

The ducted seat 28 is operatively disposed in the passenger compartment 24, proximate the cargo compartment 26. The ducted seat 28 is configured for supporting an occupant of the vehicle 20. The ducted seat 28 includes a base section 50 and a back section 52. The back section 52 extends from the base section 50 at an obtuse angle. A beltline 54 is defined between the base section 50 and the back section 52. The back section 52 extends from the beltline 54 to a top end 56. The base section 50 extends from the beltline 54 to a front end 58, generally facing the engine compartment 22 of the vehicle 20. The base section 50 and the back section 52 cooperate to present a seating surface 60 and a back surface 62, opposite the seating surface 60. The seating surface 60 is configured for supporting the occupant of the vehicle 20. The back surface 62 faces the floor 44 and the cargo compartment 26 of the vehicle 20.

Figure 2:
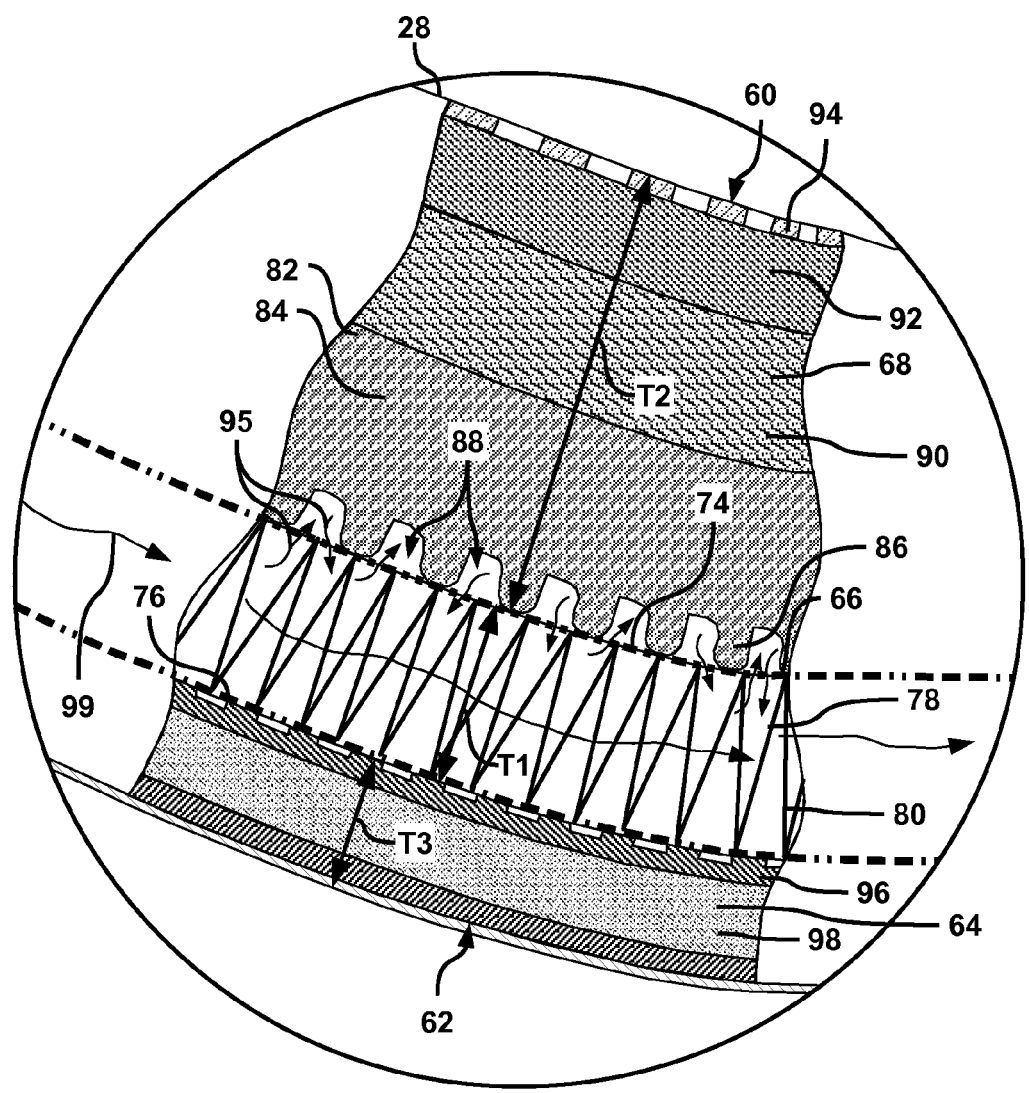
FIG. 2 an enlargement of the area "FIG. 2," as provided in FIG. 1.

Referring to FIG. 2, the ducted seat 28 includes a base layer 64, a ducting layer 66, and a cover layer 68. The ducting layer 66 operatively covers the base layer 64. The cover layer 68 operatively covers the ducting layer 66 such that the ducting layer 66 is sandwiched between the base layer 64 and the cover layer 68. The ducting layer 66 presents a leading opening 70 and trailing opening 72 in fluid communication with one another such that the ducting layer 66 is configured to receive air therein through the leading opening 70 and exhaust air through the trailing opening 72. The trailing opening 72 is in fluid communication with the cargo passage 40, such that air travels into the cargo compartment 26. The trailing opening 72 may be defined in the ducted seat 28 between the beltline 54 and the top end 56. As such, the trailing opening 72 is defined in the back surface 62 of the back section 52 to direct air from within the ducting layer 66, into the cargo passage 40.

The ducting layer 66 includes a spacer fabric, such as 3 Mesh® by Müller Textil Group. It should be appreciated that other spacer fabrics may also be used. The spacer fabric may have a thickness T1 of between 7 millimeters (mm) and 23 millimeters. More specifically, the spacer fabric may be between 10 mm and 20 mm. The spacer fabric includes a first fabric layer 74, a second fabric layer 76 spaced from the first fabric layer 74, and a connecting layer 78 interconnecting the first fabric layer 74 and the second fabric layer 76. The connecting layer 78 is configured to provide fluid permeability throughout the spacer fabric, between the first fabric layer 74 and the second fabric layer 76. The connecting layer 78 includes a yarn 80 that is resilient such that the yarn 80 biases the first fabric layer 74 and the second fabric layer 76 away from one another. The yarn 80 has a thickness of between 18 Denier and 45 Denier. The yarn 80 may be a mono-filament, multi-filament, and the like. The yarn 80 may be formed from polyethylene terephthalate (PET). The spacer fabric is configured to have an air permeability of at least 998 cubic feet per minute per square meter (CFM).

The cover layer 68 may include a foam layer 82 having a base 84 and a plurality of standoffs 86 extending from the base 84. The standoffs 86 are disposed in abutting relationship to the first fabric layer 74 such that caverns 88 are defined between adjacent standoffs 86, the first fabric layer 74, and the base 84. The foam layer 82 may be polyurethane foam and the like.

The cover layer 68 may also include a topper pad 90, a plush pad 92, and/or an upholstery layer 94. The topper pad 90 may be disposed over the base 84 of the foam. The plush pad 92 may be disposed over the topper pad 90. The upholstery layer 94 may be disposed over the plush pad 92. The upholster layer may be formed from leather, vinyl, and the like. The cover layer 68, including the foam layer 82, the topper pad 90, the plush pad 92, and/or the upholstery layer 94, may have a thickness T2 of between 35 mm and 60 mm. In a non-limiting example, the cover layer 68 is approximately 50 mm thick.

The base layer 64 may be a molded acoustic barrier. More specifically, the base layer 64 is a sound barrier that is formed from a thermoformed, heavy plastic material. The base layer 64 is configured to prevent or limit noise from traveling through the ducted seat 28 and into the passenger compartment 24. The base layer 64 may include a corrugated molded barrier layer 96 disposed in abutting relationship to the second fabric layer 76. An acoustic foam layer 98 may be disposed against the corrugated molded barrier layer 96. The base layer 64 may have a thickness T3 of between 5 mm and 15 mm.

The first fabric layer 74 may be formed as a mesh or other air permeable fabric. As a result of the air permeability of the first fabric layer 74, the caverns 88 are in fluid communication with the ducting layer 66 such that the ducting layer 66 receives air therein through the leading opening 70, as illustrated by arrow 97 in FIG. 1, and the air flows throughout the ducting layer 66, as illustrated by arrow 99 in FIGS. 1 and 2, and into/out of the caverns 88, as illustrated by arrows 95 in FIG. 2. The air is eventually exhausted through the trailing opening 72, as indicated by arrow 48.

The ducting layer 66 is disposed along a width of the ducted seat 28, which provides a large cross-section for air flow through the ducted seat 28, resulting in low airflow speed as air flows through the ducting layer 66. Low airflow speed means that there is little to no noise attenuation through the ducting layer 66. Further, since the spacer fabric of the ducting layer 66 includes the yarn 80 interconnecting the first fabric layer 74 and the second fabric layer 76, a natural filter is provided by the ducting layer 66. The natural filter provided will prevent debris from entering the ducting layer 66, without requiring additional filters to be provided.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A ducted seat for attachment to a vehicle, the ducted seat comprising:
    a base layer;
    a ducting layer operatively covering the base layer;
    wherein the ducting layer includes a spacer fabric having a first fabric layer, a second layer spaced from the first fabric layer, and a connecting layer interconnecting the first fabric layer and the second fabric layer;
    wherein the connecting layer is configured to provide air permeability throughout the spacer fabric, between the first fabric layer and the second fabric layer; and
    a cover layer operatively covering the ducting layer such that the ducting layer is sandwiched between the base layer and the cover layer;
    wherein the cover layer includes a foam layer having a base layer and a plurality of standoffs extending from the base layer;
    wherein the standoffs are disposed in abutting relationship to the first fabric layer such that caverns are defined between adjacent standoffs, the first fabric layer, and the base layer; and
    wherein the ducting layer presents a leading opening and trailing opening in fluid communication with one another such that the ducting layer is configured to receive air therein through the leading opening and exhaust air through the trailing opening.

2. A ducted seat, as set forth in claim 1, wherein the connecting layer includes a yarn that is resilient such that the yarn biases the first fabric layer and the second fabric layer away from one another.

3. A ducted seat, as set forth in claim 1, wherein the first fabric is a mesh and the caverns are in fluid communication with the ducting layer such that the ducting layer is configured to receive air therein through the leading opening, flow throughout the ducting layer and the caverns, and exhaust air only through the trailing opening.

4. A ducted seat, as set forth in claim 2, wherein the yarn includes polyethylene terephthalate.

5. A ducted seat, as set forth in claim 1, wherein the spacer fabric has a thickness of between 7 millimeters (mm) and 23 mm.

6. A ducted seat, as set forth in claim 1, wherein the spacer fabric has an air permeability of at least 998 cubic feet per minute per square meter (CFM).

7. A ducted seat, as set forth in claim 1, wherein the ducted seat is further defined as including:
   a seating section configured for attachment to the vehicle and presenting a leading opening; and
   a back section extending from the seating section at a beltline and extending to a top end;
   wherein the back section defines a trailing opening between the beltline and the top end.

8. A ducted seat, as set forth in claim 7, wherein the seating section and the back section cooperate to present a seating surface configured for supporting an occupant of the vehicle and a support surface, opposite the seating surface; and
   wherein the seating surface defines the leading opening and the support surface defines the trailing opening.

9. A vehicle comprising:
   a passenger compartment;
   a cargo compartment disposed proximate the passenger compartment;
   a battery which dissipates heat when energized such that air in the vehicle becomes heated air, the battery operatively disposed in the cargo compartment; and
   a ducted seat operatively disposed in the passenger compartment, the ducted seat comprising:
      a base layer;
      a ducting layer operatively covering the base layer;
      wherein the ducting layer includes a spacer fabric having a first fabric layer, a second layer spaced from the first fabric layer, and a connecting layer interconnecting the first fabric layer and the second fabric layer;
      wherein the connecting layer is configured to provide air permeability throughout the spacer fabric, between the first fabric layer and the second fabric layer; and
      a cover layer operatively covering the ducting layer such that the ducting layer is sandwiched between the base layer and the cover layer;
      wherein the cover layer includes a foam layer having a base layer and a plurality of standoffs extending from the base layer;
      wherein the standoffs are disposed in abutting relationship to the first fabric layer such that caverns are defined between adjacent standoffs, the first fabric layer, and the base layer;
      wherein the ducting layer presents a leading opening and trailing opening in fluid communication with one another such that the ducting layer is configured to receive air therein through the leading opening and exhaust air through the trailing opening; and
   wherein the trailing opening is disposed in fluid communication with the cargo compartment such that the exhausted air flows from the trailing opening into the cargo compartment.

10. A vehicle, as set forth in claim 9, wherein the connecting layer includes a yarn that is resilient such that the yarn biases the first fabric layer and the second fabric layer away from one another.

11. A vehicle, as set forth in claim 9, wherein the spacer fabric has a thickness of between 7 millimeters and 23 millimeters (mm).

12. A vehicle, as set forth in claim 9, wherein the spacer fabric has an air permeability of at least 998 cubic feet per minute per square meter (CFM).

13. A vehicle, as set forth in claim 9, wherein the seating section is further defined as including:
   a seating section configured for attachment to the vehicle and presenting a leading opening; and
   a back section extending from the seating section at a beltline and extending to a top end;
   wherein the back section defines a trailing opening between the beltline and the top end.

14. A vehicle, as set forth in claim 13, wherein the seating section and the back section cooperate to present a seating surface configured for supporting an occupant of the vehicle and a support surface, opposite the seating surface; and
   wherein the seating surface defines the leading opening and the support surface defines the trailing opening.

15. A vehicle, as set forth in claim 9, further comprising a cargo passage defined between the cargo compartment and the passenger compartment;
   wherein the trailing opening is in fluid communication with the cargo passage such that the exhausted air flows from the trailing opening, through the cargo passage, and into the cargo compartment.

16. A vehicle, as set forth in claim 15, further comprising a fan operatively disposed in the cargo passage;
   wherein the fan is configured to draw air from the passenger compartment into the cargo compartment such that the drawn air flows around the battery to cool the battery.

* * * * *